United States Patent
Katou et al.

(10) Patent No.: US 6,541,114 B2
(45) Date of Patent: Apr. 1, 2003

(54) COMPOSITE PARTICLES, COMPOSITE PARTICLE DISPERSION COMPOSITION, AND METHOD OF PREPARING COMPOSITE PARTICLE DISPERSION COMPOSITION

(75) Inventors: Minoru Katou, Tokyo (JP); Katsuhiko Tsuruoka, Tokyo (JP)

(73) Assignee: JSR Corporation, Tokyo (JP)

( * ) Notice: Subject to any disclaimer, the term of this patent is extended or adjusted under 35 U.S.C. 154(b) by 21 days.

(21) Appl. No.: 09/760,783

(22) Filed: Jan. 17, 2001

(65) Prior Publication Data

US 2001/0033932 A1 Oct. 25, 2001

(30) Foreign Application Priority Data

Jan. 18, 2000 (JP) ......................................... 2000-009188

(51) Int. Cl.[7] .................................................. B32B 5/16
(52) U.S. Cl. ........................ 428/403; 428/405; 428/407; 523/201; 525/288
(58) Field of Search ................................ 428/403, 405, 428/407; 523/201; 525/288

(56) References Cited

U.S. PATENT DOCUMENTS 5,708,093 A * 1/1998 Bastelberger ................ 525/288

FOREIGN PATENT DOCUMENTS

| EP | 0254418 | * | 1/1988 |
| JP | 3-045628 | | 2/1991 |
| JP | 4-214747 | | 8/1992 |
| JP | 4-261454 | | 9/1992 |

* cited by examiner

Primary Examiner—Leszek Kiliman
(74) Attorney, Agent, or Firm—Oblon, Spivak, McClelland, Maier & Neustadt, P.C.

(57) ABSTRACT

Composite particles capable of forming a coating excelling in weatherability and, in particular, stain-proof characteristics, a composite particle dispersion composition containing the composite particles and excelling in film formability, and a method of preparing the composite particle dispersion composition. The composite particles contain (i) polymer particles having 2–70 wt % of a polymer phase (a) of the core and 98–30 wt % of a polymer phase (b) of the shell, and (ii) a polymer of at least either an organosilicon compound or organometallic compound present at least either on or near the surface of the polymer phase (b), wherein the polymer phase (a) and the polymer phase (b) have different monomer compositions.

23 Claims, 1 Drawing Sheet

FIG. 1

COMPOSITE PARTICLES, COMPOSITE PARTICLE DISPERSION COMPOSITION, AND METHOD OF PREPARING COMPOSITE PARTICLE DISPERSION COMPOSITION

BACKGROUND OF THE INVENTION

1. Field of the Invention

The present invention relates to composite particles capable of forming a coating excelling in weatherability and, in particular, stain-proof characteristics, a composite particle dispersion composition excelling in film formability, and a method of preparing the composite particle dispersion composition.

2. Description of Background Art

In recent years, pollution-free coating materials have been strongly demanded from the viewpoint of environmental safeguards and health. To deal with this demand, use of aqueous coating materials, in particular, aqueous coating dispersions instead of conventional solvent-type coating materials has progressed and application fields for such aqueous coating dispersions have widened. Accompanying this, the aqueous coating dispersions are required to exhibit higher performance.

Conventionally, (meth)acrylic polymers have been widely used for coating materials as aqueous dispersions because of excellent transparency and film formability. Polysiloxanes excel in weatherability, water repellency, and adhesion to inorganic substrates and have been used in various fields including coating materials as disclosed in Japanese Patent Publication No. 39691/1977. In order to obtain a synergistic effect from excellent performances of these polymer components, Japanese Patent Applications Laid-open No. 45628/1991 and No. 261454/1992 disclose use of composite materials consisting of (meth)acrylic polymers and polysiloxanes as coating materials and the like.

These composite materials of (meth)acrylic polymers and polysiloxanes exhibit good weatherability. However, these composite materials also exhibit insufficient stain-proof characteristics such as resistance to rain streaks when exposed to the outdoors.

Japanese Patent Application Laid-open No. 214747/1992 discloses a self-crosslinking polymer latex composition containing a polyfunctional hydrazine derivative and polymer latex containing organopolysiloxane which is obtained by copolymerizing monomers containing a carbonyl group and other monomers in the presence of hydrolyzable silane. This composition forms a coating excelling in weatherability, stain-proof characteristics, and the like. However, this composition cannot produce a coating retaining weatherability, stain-proof characteristics, and UV-degradation resistance for a long period of time and exhibits insufficient film formability.

As described above, it is very difficult to provide an aqueous dispersion with performance capable of retaining both weatherability and stain-proof characteristics for a long period of time when used as a coating material. Therefore, improvement of the performance and film formability of the aqueous dispersion has been demanded.

Accordingly, an object of the present invention is to provide composite particles used in a dispersion capable of forming a coating excelling in weatherability and, in particular, stain-proof characteristics.

Another object of the present invention is to provide a composite particle dispersion composition capable of forming a coating excelling in weatherability, in particular, stain-proof characteristics and capable of retaining these characteristics for a long period of time.

A further object of the present invention is to provide a method of preparing the composite particle dispersion composition.

SUMMARY OF THE INVENTION

The above objects of the present invention can be achieved by composite particles comprising: (i) polymer particles which comprise 2–70 wt % of a polymer phase (a) of the core and 98–30 wt % of a polymer phase (b) of the shell; and (ii) a polymer of an organosilicon compound or organometallic compound, or both, present at least either on or near the surface of the polymer phase (b); wherein the polymer phase (a) and the polymer phase (b) have different monomer compositions.

In a preferred embodiment of the composite particles of the present invention, each of the polymer phase (a) and the polymer phase (b) is a (meth)acrylic polymer, a (meth)acrylic silicon polymer, a fluorine-containing polymer, a polyurethane, a urethane/acrylic polymer, or a diene polymer.

In another preferred embodiment of the composite particles of the present invention, the polymer (ii) is chemically bonded to the polymer phase (b).

In still another preferred embodiment of the composite particles of the present invention, the organosilicon compound or the organometallic compound is a compound shown by the following formula (1):

$$R^1_n M(OR^2)_{z-n} \qquad (1)$$

wherein $R^1$ represents a hydrogen atom or an organic group having 1–8 carbon atoms (excluding the group represented by $OR^2$), $R^2$ represents an alkyl group having 1–6 carbon atoms, an acyl group having 1–6 carbon atoms, or an aryl group having 6–10 carbon atoms, M represents Si or metal atom with a valence of 3 or more, n is 0 or an integer of 1 or more, z is a valence of M, and z-n is an integer of 2 or more, provided that, when a plurality of $R^1$s is present, each $R^1$ may be the same or different, this also applies to $R^2$.

In a further preferred embodiment of the composite particles of the present invention, the content of the polymer (ii) is 0.5–100 parts by weight for 100 parts by weight of the polymer particles (i).

In the above composite particles, the difference in the gel content between the polymer phase (a) and the polymer phase (b) is preferably 5 wt % or more.

In the above composite particles, the difference in the glass transition temperature between the polymer phase (a) and the polymer phase (b) is preferably 5° C. or more.

In the above composite particles, a UV absorbent monomer or a radical scavenging monomer, or both, may be copolymerized with at least either the polymer phase (a) or the polymer phase (b).

The above UV absorbent monomer is preferably a compound selected from the group consisting of p-(meth)acryloxyphenyl salicylate, 2-hydroxy-4-(meth)acryloxybenzophenone, and 2-(2'-hydroxy-5'-(meth)acryloxyethylphenyl)benzotriaole.

The above radical scavenging monomer is preferably a compound selected from the group consisting of 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloylamino-1,2,2,6,6-pentamethylpiperidine, 4-cyano-4-

(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

In the above composite particles, the proportion of the UV absorbent monomer or radical scavenging monomer copolymerized in the polymer particles (i) is preferably 0.1–30 wt %.

The composite particles of the present invention preferably have an average particle diameter of 5 µm or less.

The composite particles of the present invention preferably have a minimum film-forming temperature of the composite particles is 90° C. or less.

The above objects of the present invention can be further achieved by a composite particle dispersion composition comprising: (A) composite particles comprising (i) polymer particles which comprise 2–70 wt % of a polymer phase (a) of the core and 98–30 wt % of a polymer phase (b) of the shell, and (ii) a polymer of at least either an organosilicon compound or organometallic compound present at least either on or near the surface of the polymer phase (b), wherein the polymer phase (a) and the polymer phase (b) have different monomer compositions; and (B) a poor solvent for the composite particles (A).

In the composite particle dispersion composition of the present invention, the weight ratio of the composite particles (A) to the poor solvent (B) (composite particles/poor solvent) is preferably from 5/95 to 70/30.

The above objects of the present invention can be still further achieved by a method of preparing a composite particle dispersion composition, comprising: (i) preparing a dispersion liquid which comprises (A) polymer particles comprising 2–70 wt % of a polymer phase (a) of the core and 98–30 wt % of a polymer phase (b) of the shell, wherein a functional group capable of forming a linkage group by reaction with a group shown by formula $OR^2$ ($R^2$ represents an alkyl group having 1–6 carbon atoms, an acyl group having 1–6 carbon atoms, or an aryl group having 6–10 carbon atoms) is bonded at least either on or near the surface of the polymer phase (b), and (B) a poor solvent for the polymer particles (A); (ii) preparing (C) a compound shown by the following formula (1);

$$R^1_n M(OR^2)_{z-n} \quad (1)$$

wherein $R^1$ represents a hydrogen atom or an organic group having 1–8 carbon atoms (excluding the group represented by $OR^2$), $R^2$ represents an alkyl group having 1–6 carbon atoms, an acyl group having 1–6 carbon atoms, or an aryl group having 6–10 carbon atoms, M represents Si or a metal atom with a valence of 3 or more, n is 0 or an integer of 1 or more, z is a valence of M, and z-n is an integer of 2 or more, provided that, when a plurality of $R^1$s is present, each $R^1$ may be the same or different, this also applies to $R^2$; and (iii) polycondensing the compound (C) in the dispersion liquid.

The method of preparing a composite particle dispersion composition of the present invention may further comprise reacting the functional group bonded to the polymer particles (A) with (D) a compound shown by the following formula (2) before polycondensing the compound (C) shown by the formula (1):

$$R^1_x R^3_y M(OR^2)_{z-x-y} \quad (2)$$

wherein $R^1$, $R^2$, and M are the same as defined for the formula (1), $R^3$ represents a group capable of forming a linkage group by the reaction with the functional group bonded to the polymer particles (A) (excluding the group represented by $OR^2$), x is 0 or an integer of 1 or more, y is an integer of 1 or more, z is a valence of M, and z-x-y is an integer of 1 or more, provided that, when a plurality of $R^1$s is present, each $R^1$ may be the same or different, this also applies to $R^2$ and $R^3$.

DETAILED DESCRIPTION OF THE INVENTION AND PREFERRED EMBODIMENT

The present invention will be described in more detail.

The composite particles according to the present invention comprise (i) polymer particles which comprise (i) 2–70 wt % of a polymer phase (a) of the core and 98–30 wt % of a polymer phase (b) of the shell (provided that the total weight of the polymer phase (a) and the polymer phase (b) is 100 wt %) (hereinafter called "polymer particles (i)"), and (ii) a polymer of at least either an organic silicon compound or an organometallic compound (hereinafter called "polymer (ii)") present at least either on or near the surface of the polymer phase (b) of the shell of the polymer particles.

The polymer phase (a) of the core and the polymer phase (b) of the shell satisfy one of the following conditions (1) and (2):

Condition (1): The monomer unit which forms the polymer phase (a) and the monomer unit which forms the polymer phase (b) are different; and Condition (2): The monomer unit which forms the polymer phase (a) and the monomer unit which forms the polymer phase (b) are the same, but the proportion of the monomer unit in the polymer phase (a) and the monomer unit in the polymer phase (b) is different.

Figure 1:
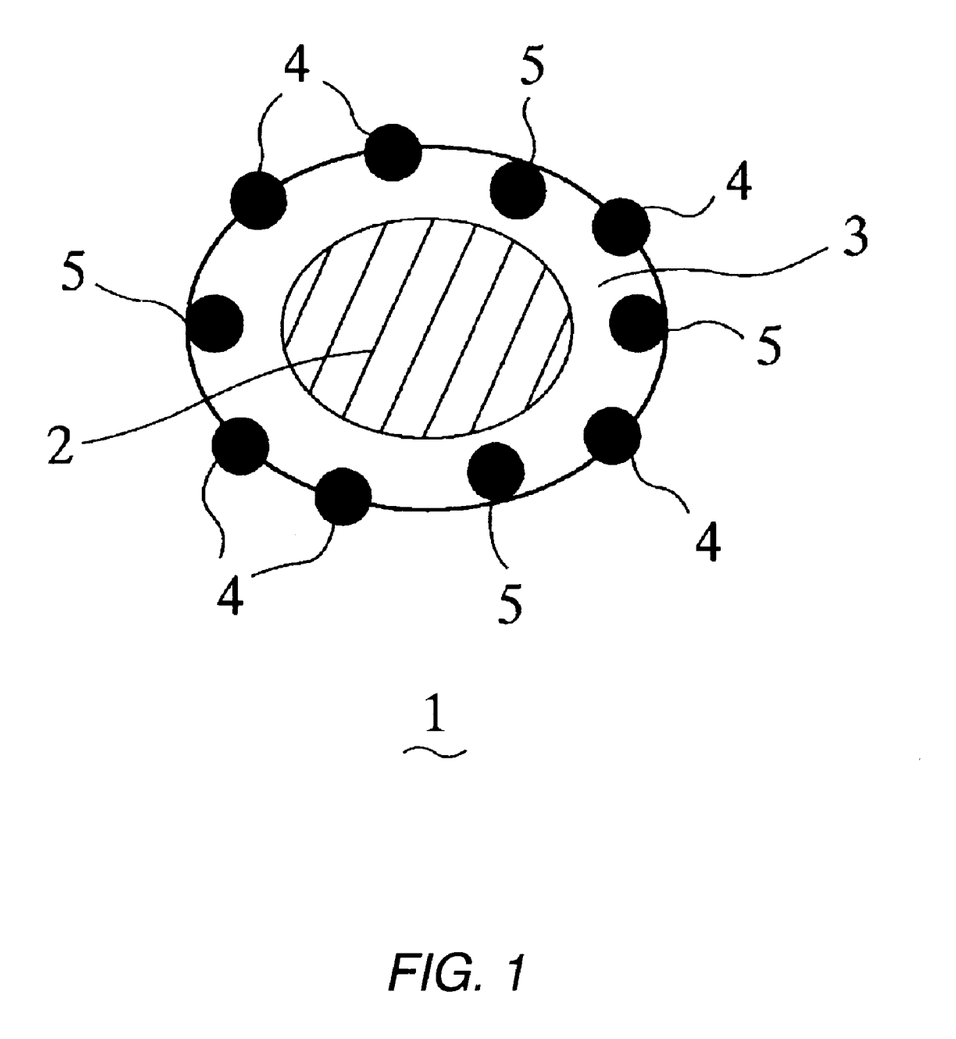
FIG. 1 is a view schematically showing composite particles according to the present invention.

FIG. 1 schematically shows an embodiment of the structure of the composite particles according to the present invention. In FIG. 1, a composite particle (1) consists of a polymer phase (a) 2 of the core, a polymer phase (b) 3 of the shell which covers the polymer phase (a) 2, polymers (ii) 4 present on the surface of the polymer phase (b) 3 of the shell, and polymers (ii) 5 present near the surface of the polymer phase (b) 3 of the shell.

In the present invention, the core of the polymer particles (i) is formed of the polymer phase (a) which forms the inner portion of the composite particles, and the shell of the polymer particles (i) is formed of the polymer phase (b) which forms the outer portion of the composite particles. It is preferable that the core be completely covered by the shell. Note, however, that the core may not be completely covered by the shell.

In the present invention, the term "present near the surface of the polymer phase (b)" means that the polymer (i) is completely embedded in the polymer phase (b) such as the polymer (ii) 5 shown in FIG. 1.

The composite particles, the composite particle dispersion composition comprising the composite particles, and the method of preparing the composite particle dispersion composition according to the present invention will be described below.

(1) Composite Particles

<Polymer Particles (i)>

The condition (1) or (2) relating to the polymer phase (a) and (b) of the polymer particles (i) are necessary conditions for the polymer phase (a) and the polymer phase (b) to have different compositions.

For example, the condition (1) is satisfied in the case where the monomer components of the polymer phase (a) are (A, B, C), and the monomer components of the polymer phase (b) are (A, B), (A, B, D), or (A, B, C, D).

When the monomer components of the polymer phase (a) are (A, B, C) and the monomer components of the polymer phase (b) are (A, B, C), the condition (2) is satisfied in the case where the proportion of at least one of the monomer components A, B, and C differs between the polymer phase (a) and the polymer phase (b).

As examples of the polymer particles (i), the following polymer particles are preferable.

(1) Polymer particles in which the difference in the gel content between the polymer phase (a) and the polymer phase (b) is 5 wt % or more. The gel content in the polymer phase with a lower gel content may be 0 wt %. The gel content is determined as the content of components insoluble in an organic solvent such as toluene.

(2) Polymer particles in which the polymer phase (a) and the polymer phase (b) have compositions so that the difference in the glass transition temperature (hereinafter may be abbreviated as "the Tg") between the polymer phase (a) and the polymer phase (b) is 2° C. or more, and preferably 5° C. or more.

The glass transition temperature of the polymer phase (a) and the polymer phase (b) of the polymer particles (i) is determined according to the performance of a coating formed using the composite particles of the present invention.

In the case where stain-proof characteristics and hardness of the coating are important, for example, the Tg of the polymer phase (b) is set higher than the Tg of the polymer phase (a) in the range of preferably 5° C. or more, and still more preferably 10° C. or more. Specifically, the Tg of the polymer phase (b) is set preferably from 10 to 90° C., and still more preferably from 20 to 80° C., and the Tg of the polymer phase (a) is set preferably from –50 to 10° C., and still more preferably from –45 to 5° C.

In the case where flexibility and adhesion of the coating are important, the Tg of the polymer phase (b) is set lower than the Tg of the polymer phase (a) in the range of preferably 5° C. or more, and still more preferably 10° C. or more. Specifically, the Tg of the polymer phase (b) is set preferably from –50 to 30° C., and still more preferably from –40 to 20° C., and the Tg of the polymer phase (a) is set preferably from 10 to 90° C., and still more preferably from 20 to 70° C.

The glass transition temperature used here in is calculated using the following equation as an absolute temperature and converted to centigrade.

$$1/Tg = \Sigma Wj/Tgj$$

Wherein:
Tg: Glass transition temperature (absolute temperature) of polymer phase of the core or shell
Tgj: Glass transition temperature (absolute temperature) of homopolymer consisting of only monomer component (j)
Wj: Weight fraction of monomer component (j) in polymer phase The polymer particles (i) in which the polymer phases of the core and shell have different glass transition temperatures are prepared by polymerizing monomers capable of forming the polymers (homopolymer or copolymer) for forming each polymer phase according to the desired glass transition temperature of the polymer phases of the shell and core.

The following description is common to the polymer particles (i).

In the polymer particles (i), the proportion of the polymer phase (a) is 2–70 wt %, and preferably 10–60 wt %, and the proportion of the polymer phase (b) is 98–30 wt %, and preferably 90–40 wt %. Note that the weight percentage of the polymer phase (a) and the polymer phase (b) in total is 100 wt %.

If the proportion of the polymer phase (a) is less than 2 wt % (proportion of the polymer phase (b) exceeds 98 wt %), the objects of the present invention cannot be achieved. If the proportion of the polymer phase (a) exceeds 70 wt % (proportion of the polymer phase (b) is less than 30 wt %), the objects of the present invention cannot be achieved.

In order to improve weatherability of the coating formed using the composite particles of the present invention, at least either UV absorbent monomers or radical scavenging monomers may be copolymerized in either the polymer phase (a) or the polymer phase (b).

Specific examples of these monomers are illustrated in the description of the method of preparing the dispersion liquid of the composite particles as monomers which may be copolymerized with (meth)acrylate polymers, which are preferable polymers for forming the polymer phase (a) and the polymer phase (b) in the polymer particles (i).

The proportion of UV absorbent monomers and/or radical scavenging monomers to be copolymerized is 0.1–30 wt % of the polymer particles (i).

The polymer particles (i) is prepared by forming the polymer phase (a) by (co)polymerization and forming the polymer phase (b) by (co)polymerization. Examples of other methods include a method of forming the polymer phase (b) which is hydrophilic relative to the polymer phase (a) by (co)polymerization and forming the polymer phase (a) which is relatively hydrophobic by (co)polymerization, thereby forming the polymer phase (a) inside the polymer phase (b).

<Polymer (ii)>

In the composite particles of the present invention, the polymer (ii) of at least either an organic silicon compound or an organometallic compound is present at least either on or near the surface of the polymer phase (b) of the polymer particles (i). The polymer (ii) is preferably chemically bonded in the area at least either on or near the surface of the polymer phase (b) of the polymer particles (i) through a linkage group. The chemical bond is preferably a covalent bond or an ionic bond.

The composition of the polymer (ii) is more readily understood by referring to the method of preparing the composite particle dispersion composition comprising the composite particles of the present invention as described later.

The amount of the polymer (ii) present at least either on or near the surface of the polymer phase (b) of the polymer particles (i) is preferably 0.5–100 parts by weight, still more preferably 1–60 parts by weight, and particularly preferably 2–40 parts by weight for 100 parts by weight of the polymer particles (i). Specifying the amount of the polymer (ii) in the above range ensures that the coating formed using the composite particles of the present invention is provided with excellent weatherability and, in particular, excellent stain-proof characteristics.

In addition, the polymer particles (i) may be included in the polymer phase (a) or in the polymer phase (b).

<Preferable Properties of Composite Particles>

The average particle diameter of the composite particles of the present invention dispersed in the dispersion is preferably 5 μm or less, more preferably 2 μm or less, still more preferably 1 μm or less, and particularly preferably 0.03–0.5 μm in view of stability of the composite particle dispersion composition comprising the composite particles. The method of measuring the average particle diameter is illustrated in examples described later.

The minimum film-forming temperature of the composite particles of the present invention is preferably 90° C. or less, and still more preferably 80° C. or less.

The minimum film-forming temperature used herein is the lowest temperature at which a coating can be formed by evaporating a solvent from the dispersion liquid containing the composite particles applied to a substrate. The specific measuring method is described in T. F. Protzman, J. Appl. Polymer Sci., volume 4, 81 (1960).

A coating formed from the dispersion liquid containing the composite particles having the above structure and properties exhibits excellent weatherability and, in particular, excellent stain-proof characteristics. This is because the polymer (ii) is present on the surface of the coating at a high concentration even if the proportion of the polymer (ii) in the coating is small.

(2) Composite Particle Dispersion Composition and Method of Preparing Composite Particle Dispersion Composition The coating formed from the composite particle dispersion composition in which the composite particles of the present invention are preferably dispersed in a poor solvent for the composite particles exhibits excellent weatherability and, in particular, excellent stain-proof characteristics in the case where the polymer phases of the core and shell are formed of (meth)acrylic polymers, (meth)acrylic silicon polymers, fluorine-containing polymers, polyurethanes, or urethane acrylic polymers. In the case of diene polymers, the coating excels in stain-proof characteristics and mechanical characteristics.

The composite particle dispersion composition and the method of preparing the composite particle dispersion composition of the present invention will be described below. In the following description, a composite particle dispersion composition containing the composite particles of which the polymer phases of the polymer particle (i) are formed of (meth)acrylic polymers is taken as an example.

<Solvent for Composite Particle Dispersion Composition>

The poor solvent for the composite particles preferably used in the composite particle dispersion composition of the present invention is a poor solvent for the polymer which forms the composite particles such as (meth)acrylic polymers. Specific examples include water, aliphatic hydrocarbons such as alcohols, polyethylene glycol monoalkyl ethers, and n-hexane, and mixed solvents thereof. Of these, use of water is preferable in view of ease of preparation of the composite particle dispersion composition and working environment when using the composite particle dispersion composition as a coating material.

The weight ratio of the composite particles to the poor solvent (composite particles/poor solvent) is preferably from 5/95 to 70/30, and still more preferably from 20/80 to 60/40. Specifying the weight ratio in this range ensures that the concentration of the composite particles in the composite particle dispersion composition and viscosity of the composite particle dispersion composition will well-balanced when applying the composite particle dispersion composition to a coating material. Therefore, a coating with a desired thickness can be formed with good workability.

In the case where the polymer particles (i) which form the composite particles are formed of polymers other than (meth)acrylic polymers, an appropriate poor solvent is selected according to the type of polymer and the weight ratio of the composite particles to the poor solvent is determined from the above viewpoint. In this case, it is preferable that the poor solvent be water and the weight ratio of the composite particles to the poor solvent be in the above range.

<Method of Preparing Composite Particle Dispersion Composition>

The method of preparing the composite particle dispersion composition of the present invention is described below.

The composite particle dispersion composition of the present invention is prepared by polycondensing an organosilicon compound or organometallic compound (hereinafter may be called "alkoxy compound") shown by the above formula (1) in a dispersion liquid comprising (A) polymer particles in which a functional group capable of forming a linkage group by reaction with a group represented by $OR^2$ in the formula (1) (hereinafter may be called "linkage-group-forming functional group") is present at least either on or near the surface of the polymer phase (b) and (B) a poor solvent.

In the above method, preferable results can be obtained by previously reacting the polymer particles (A) with the compound (D) shown by the above formula (2) before polycondensing the compound (C).

The polymer particles (A) correspond to the polymer particles (i).

The dispersion liquid used in the preparation of the composite particle dispersion composition of the present invention is prepared by forming the polymer particles (A) in the poor solvent (B), for example, an aqueous medium by emulsion polymerization.

There are no specific limitations to the linkage-group-forming functional group present at least either on or near the surface of the polymer phase (b) insofar as the group can form a linkage group by the reaction with the group represented by $OR^2$ in the formula (1) or the group represented by $R^3$ in the formula (2). As specific examples of the linkage-group-forming functional group, a carboxyl group, acid anhydride group, hydroxyl group, epoxy group, amino group, amide group, silanol group, hydrazide group, carbonyl group, acetyl group, and the like can be given. Of these, a carboxyl group, amino group, and silanol group are preferable to ensure a smooth reaction.

Monomers having the linkage-group-forming functional group are present at least either on or near the surface of the polymer phase (b) at a concentration of preferably 0.1–30 wt %, and particularly preferably 0.5–20 wt %.

In the case where the polymer phase (a) and the polymer phase (b) of the polymer particles (A) are formed of (meth) acrylic polymers, polymerization for preparing the dispersion liquid containing the polymer particles (A) is preferably carried out by forming the polymer phase (a) by (co) polymerizing an alkyl (meth)acrylate given below and forming the polymer phase (b) by copolymerizing an alkyl (meth)acrylate given below and monomers having the linkage-group-forming functional group. Examples of other methods include a method of forming the polymer phase (b) which is hydrophilic relative to the polymer phase (a) by polymerization, and forming the polymer phase (a) which is relatively hydrophobic inside the polymer phase (b) by polymerization. In this case, monomers for forming the polymer phase (b) are appropriately selected so that the polymer phase (b) is hydrophilic relative to the polymer phase (a).

An alkyl in the alkyl (meth)acrylate monomer may have a substituent. The number of carbon atoms in the alkyl including the substituent is preferably 1–20. As examples of such monomers, alkyl (meth)acrylates and cycloalkyl (meth) acrylates such as methyl (meth)acrylate, ethyl (meth) acrylate, n-propyl (meth)acrylate, i-propyl (meth)acrylate, n-butyl (meth)acrylate, i-butyl (meth)acrylate, sec-butyl (meth)acrylate, t-butyl (meth)acrylate, n-amyl (meth) acrylate, i-amyl (meth)acrylate, n-hexyl (meth)acrylate, cyclohexyl (meth)acrylate, 2-ethylhexyl (meth)acrylate, n-octyl (meth)acrylate, n-nonyl (meth)acrylate, i-nonyl (meth)acrylate, p-t-butylcyclohexyl (meth)acrylate, n-decyl (meth)acrylate, and n-dodecyl (meth)acrylate, benzyl (meth) acrylate, and the like can be given.

These (meth)acrylates may be used either individually or in combination of two or more.

As examples of the monomers having the linkage-group-forming functional group, the following compounds can be given.

(I) Carboxyl group:

α,β-Ethylenically unsaturated monocarboxylic acids such as (meth)acrylic acid and crotonic acid; monoalkyl esters and monoamides of α,β-ethylenically unsaturated dicarboxylic acids such as itaconic acid, fumaric acid, and maleic acid (II) Acid anhydride group:

Acid anhydrides of α,β-ethylenically unsaturated dicarboxylic acids such as itaconic acid, fumaric acid, and maleic acid (III) Hydroxyl group:

Hydroxyalkyl (meth)acrylates such as hydroxymethyl (meth)acrylate, 2-hydroxyethyl (meth)acrylate, 2-hydroxypropyl (meth)acrylate, and 3-hydroxypropyl (meth)acrylate; N-methylol(meth)acrylamide; and the like (IV) Amino group:

Aminoalkyl (meth)acrylates such as 2-aminoethyl (meth) acrylate, 2-dimethylaminoethyl (meth)acrylate, 2-aminopropyl (meth)acrylate, 3-aminopropyl (meth) acrylate, 3-dimethylaminopropyl (meth)acrylate, and 2-butylaminoethyl (meth)acrylate; and the like (V) Epoxy group:

Glycidyl (meth)acrylate, allyl glycidyl ether, and the like

The copolymerization ratio of alkyl (meth)acrylate to the monomer having a linkage-group-forming functional group used to form the polymer phase (b) is determined so that the weight ratio of the alkyl (meth)acrylate to the monomer is preferably from 70/30 to 99.9/0.1, and particularly preferably from 80/20 to 99.5/0.5.

Monomers other than the above monomers maybe copolymerized with the (meth)acrylic polymers of the polymer phase (a) and the polymer phase (b) insofar as the objects of the present invention can be achieved.

Examples of other monomers which can form the (meth) acrylic polymers include: aliphatic conjugated dienes such as 1,3-butadiene, isoprene, and chloroprene; aromatic vinyl compounds such as styrene, α-methylstyrene, and vinyl toluene; vinyl carboxylates such as vinyl acetate, vinyl propionate, and vinyl benzoate; vinyl cyanide compounds such as (meth)acrylonitrile; UV absorbent monomers such as p-(meth)acryloxyphenyl salicylate, 2-hydroxy-4-(meth) acryloxybenzophenon, and 2-(2'-hydroxy-5'-(meth) acryloxyethylphenyl)benzotriaole; and radical scavenging polymerizable monomers such as 4-(meth)acryloyloxy-2,2, 6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloylamino-1,2,2,6,6-pentamethylpiperidine, 4-cyano-4-(meth)acryloylamino-2, 2,6,6-tetramethylp iperidine, 1-(meth)acryloyl-4-(meth) acryloylamino-2,2,6,6-tetr amethylpiperidine, 1-(meth) acryloyl-4-cyano-4-(meth)acryloylamino-2,2,6,6-tetr amethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2, 6,6-tetramethylpiperidine. These monomers may be used either individually or in combination of two or more.

It is preferable to use at least either the UV absorbent monomers or radical scavenging monomers. The proportion of these monomers is preferably 0.1–30 wt % of the polymer particles (A).

The dispersion liquid in which the polymer particles (A) are dispersed in the poor solvent is prepared using a method of copolymerizing the above monomers in an aqueous solvent by emulsion polymerization, for example.

The emulsion polymerization is carried out using a radical polymerization initiator in a soap-free system or in the presence of an emulsifier.

As examples of radical polymerization initiators, redox initiators consisting of an oxidant such as organic hydroperoxides such as cumene hydroperoxide, diisopropylbenzene hydroperoxide, and paramenthane hydroperoxide and a reducing agent such as sugar-containing iron pyrophosphate, sulfoxylate, sugar-containing iron pyrophosphate/sulfoxylate; persulfates such as potassium persulfate and ammonium persulfate; azo compounds such as azobisisobutyronitrile, dimethyl-2,2'-azobisisobutyrate, and 2-carbamoylazoisobutyronitrile; organic peroxides such as benzoyl peroxide, lauroyl peroxide, t-butyl peroxy-2-ethylhexanoate; and the like can be given. Of these, redox initiators and persulfates are preferable.

The amount of radical polymerization initiator to be used is 0.05–5 parts by weight, and preferably 0.1–2 parts by weight for 100 parts by weight of the monomers in total used to form the polymer phase (a) and the polymer phase (b).

In the case of carrying out polymerization in a soap-free system, a hydrophilic compound such as persulfate is used as a radical polymerization initiator in an amount of 1–10 parts by weight, and preferably 2–5 parts by weight, instead of using an emulsifier. In this case, a water-soluble polymer such as polyacrylic acid or polyvinyl alcohol may be used as an emulsification promoter.

As examples of emulsifiers, anionic emulsifiers, nonionic emulsifiers, cationic emulsifiers, amphoteric emulsifiers, and the like can be given. In particular, reactive emulsifiers having a radically polymerizable ethylenically unsaturated bond in the molecule is preferably used.

Examples of anionic emulsifiers include reactive emulsifiers such as an alkaline metal salt of higher alcohol sulfuric acid ester, an alkaline metal salt of alkylbenzene sulfonic acid, an alkaline metal salt of dialkylsulfonic acid succinate, an alkaline metal salt of alkyl diphenyl ether disulfonic acid, a sulfate of polyoxyethylene alkyl (or alkyl phenyl) ether, commercially available products such as LATEMUL S-180A (manufactured by Kao Corp.), ELEMINOL JS-2 (manufactured by Sanyo Chemical Industries, Ltd.), AQUALON HS-10 (manufactured by Daiichi Kogyo Seiyaku Co., Ltd.), AQUALON BC-10 (manufactured by Daiichi Kogyo Seiyaku Co., Ltd.), Adekareasoap SE-10N (manufactured by Asahi Denka Kogyo K.K.), and Antox MS-60 (manufactured by Nippon Nyukazai Co., Ltd.), and the like.

Examples of nonionic emulsifiers include reactive emulsifiers such as polyoxyethylene alkyl ether, polyoxyethylene alkyl phenyl ether, commercially available products such as AQUALON RN-20 (manufactured by Daiichi Kogyo Seiyaku Co., Ltd.) and Adekareasoap NE-20 (manufactured by Asahi Denka Kogyo K.K.), and the like.

Examples of cationic emulsifiers include alkylpyridinyl chloride, alkylammonium chloride, and the like. As examples of amphoteric emulsifiers, lauryl betaine is suitably used.

The amount of emulsifier to be used is 5 parts by weight or less for 100 parts by weight of the monomers in total used to form the polymer phase (a) and the polymer phase (b).

The emulsion polymerization is preferably carried out in a soap-free system or using reactive emulsifiers so as not to impair weatherability of the resulting coating.

The emulsion polymerization is carried out using a chain transfer agent, electrolyte, pH adjustment agent, or the like, as required, in addition to the radical polymerization initiator and emulsifier. The emulsion polymerization is carried out using 50–500 parts by weight of water as the poor solvent and the above amounts of the radical polymerization initiator and emulsifier for 100 parts by weight of the monomers in total used to form the polymer phase (a) and the polymer phase (b) at a temperature of 5–100° C., and preferably 50–90° C. for of 0.1–10 hours (time required for forming the polymer phase (a) and the polymer phase (b)).

As the polymerization method, a batch method, method of adding the monomers either separately or continuously, method of adding the pre-emulsion of the monomers either separately or continuously, method of combining these methods stepwise, or the like can be employed. In the case of using low water-solubile monomers, it is preferable to prepare a pre-emulsion by previously emulsifying the monomers, water, and emulsifier using a high-pressure homogenizer or ultrasonic disperser and to polymerize the monomers using a batch method, method of adding the monomers either separately or continuously, or the like. The conversion rate of polymerization is preferably 98 wt % or more.

The composite particle dispersion composition of the present invention is prepared by polycondensing the compound (C) shown by the following formula (1) in the dispersion liquid in which the polymer particles (A) are dispersed in the poor solvent (B). The compound shown by the formula (1) is hereinafter called "alkoxy compound (C)" which is a typical compound of the formula (1).

The polymer (ii) is produced by polycondensing the alkoxy compound (C):

$$R^1_n M(OR^2)_{z-n} \qquad (1)$$

wherein $R^1$ represents a hydrogen atom or an organic group having 1–8 carbon atoms (excluding the group represented by $OR^2$), $R^2$ represents an alkyl group having 1–6 carbon atoms, an acyl group having 1–6 carbon atoms, or an aryl group having 6–10 carbon atoms, M represents Si or a metal atom with a valence of 3 or more, n is 0 or an integer of 1 or more, z is the valence of M, and z-n is an integer of 2 or more, provided that, when a plurality of $R^1$s is present, each $R^1$ maybe the same or different. This also applies to $R^2$.

In the above method, it is preferable to react the polymer particles (A) with the compound (D) shown by the formula (2) given below before polycondensing the alkoxy compound (C). This causes the linkage-group-forming functional group bonded to the polymer particles (A) and $R^3$ in the formula (2) to bond, whereby a linkage group is formed. The group represented by $M(OR^2)$ chemically bonds in the area at least either on or near the surface of the polymer particles (A) through the linkage group. Therefore, the polymer formed during the polymerization of the alkoxy compound (C) is chemically bonded to the polymer particles (A) with high efficiency. The compound shown by the formula (2) is hereinafter called "alkoxy compound (D)" which is a typical compound of the formula (2):

$$R^1_x R^3_y M(OR^2)_{z-x-y} \qquad (2)$$

wherein $R^1$, $R^2$, and M are the same as defined for the formula (1), $R^3$ represents a group capable of forming a linkage group by the reaction with the linkage-group-forming functional group bonded to the polymer particles (A) (excluding the group represented by $OR^2$), x is 0 or an integer of 1 or more, y is an integer of 1 or more, z is a valence of M, and z-x-y is an integer of 1 or more, provided that, when a plurality of $R^1$s is present, each $R^1$ may be the same or different. This also applies to $R^2$ and $R^3$.

M in the formulas (1) and (2) is preferably Si, Ti, Al, or the like. Of these, Si is particularly preferable.

In the formulas (1) and (2), as examples of an organic group having 1–8 carbon atoms represented by $R^1$, an alkyl group such as a methyl group, ethyl group, n-propyl group, i-propyl group, n-butyl group, i-butyl group, sec-butyl group, t-butyl group, n-hexyl group, and n-octyl group, γ-chloropropyl group, γ-bromopropyl group, 3,3,3-trifluoropropyl group, γ-glycidoxypropyl group, γ-(meth)acryloxypropyl group, γ-mercaptopropyl group, γ-aminopropyl group, vinyl group, phenyl group, 3,4-epoxycyclohexylethyl group, and the like can be given.

As examples of an alkyl group or acyl group having 1–6 carbon atoms represented by $R^2$ in the formulas (1) and (2), a methyl group, ethyl group, n-propyl group, i-propyl group, n-butyl group, i-butyl group, sec-butyl group, t-butyl group, n-pentyl group, n-hexyl group, acetyl group, propionyl group, butyryl group, and the like can be given. As examples of an aryl group having 6–10 carbon atoms represented by $R^2$, a phenyl group, tolyl group, xylyl group, benzyl group, and the like can be given.

As examples of a group represented by $R^3$ in the formula (2), a group which can react more readily with the linkage-group-forming functional group chemically bonded to the polymer particles (A) than the group represented by $OR^2$ is preferable. Specific examples include a glycidyl group, amino group, and the like.

Specific examples of the alkoxy compound (C) include: tetramethoxysilane, tetraethoxysilane, tetra-n-propoxysilane, tetra-i-propoxysilane, tetra-n-butoxysilane, tetra-i-butoxysilane, methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, i-butyltrimethoxysilane, γ-chloropropyltrimethoxysilane, γ-chloropropyltriethoxysilane, 3,3,3-trifluoropropyltrimethoxysilane, 3,3,3-trifluoropropyltriethoxysilane, γ-glycidoxypropyltrimethoxysilane, γ-glycidoxypropyldimethoxyalkylsilane, γ-glycidoxypropyltriethoxysilane, γ-glycidoxypropyldiethoxyalkylsilane, γ-methacryloxypropyltrimethoxysilane, γ-methacryloxypropyltriethoxysilane, γ-mercaptopropyltrimethoxysilane, γ-mercaptopropyltriethoxysilane, γ-aminopropyltrimethoxysilane, γ-aminopropyltriethoxysilane, vinyltrimethoxysilane, vinyltriethoxysilane, phenyltrimethoxysilane, phenyltriethoxysilane, 3,4-epoxycyclohexylethyltrimethoxysilane, 3,4-epoxycyclohexylethyltriethoxysilane, dimethyldimethoxysilane, dimethyldiethoxysilane, diethyldimethoxysilane; organic titanium compounds such as tetramethoxytitanium, tetraethoxytitanium, tetrapropoxytitanium, tetrabutoxytitanium, methyltrimethoxytitanium, and methyltriethoxytitanium; organic aluminum compounds such as triethoxyaluminum and tripropoxyaluminum; and the like.

Of these, dimethyldimethoxysilane, dimethyldiethoxysilane, methyltrimethoxysilane, methyltriethoxysilane, i-butyltrimethoxysilane, and phenyltriethoxysilane are preferable.

The alkoxy compound (C) may be used either individually or in combination of two or more.

As specific examples of the alkoxy compound (D), 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatepropyltrimethoxysilane, 3-isocyanatepropyltriethoxysilane, γ-glycidoxypropyltrimethoxysilane, γ-glycidoxypropyltriethoxysilane, γ-glycidoxypropylalkyldimethoxysilane, γ-glycidoxypropylalkyldiethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane, 3-ureidopropyltriethoxysilane, and the like can be given.

Of these, γ-glycidoxypropyltrimethoxysilane, γ-glycidoxypropyltriethoxysilane, γ-glycidoxypropyldimethoxymethylsilane, and γ-glycidoxypropyldiethoxymethylsilane are preferable.

The alkoxy compound (D) may be used either individually or in combination of two or more.

The composite particle dispersion composition in which the composite particles of the present invention are dispersed is prepared by polymerizing the alkoxy compound (C) in the dispersion liquid in which the polymer particles (A) are dispersed. It is preferable to polycondense the alkoxy compound (C) after reacting the alkoxy compound (D) with the polymer particles (A) for the reasons as described above. In both cases, the alkoxy compound (D) may be present when polycondensing the alkoxy compound (C).

When polycondensing the alkoxy compound (C), a compound in which z-n in the formula (1) is 1 may be added in an amount of preferably ½ mol or less for 1 mol of the alkoxy compound (C). The addition of an excess amount of the alkoxy compound should be avoided because the excess amount of the alkoxy compound (C) may terminate the polycondensation, whereby a polymer with a high molecular weight cannot be obtained.

The reaction of the alkoxy compound (D) with the polymer particles (A) can be carried out by adding the alkoxy compound (D) to the dispersion liquid (pH: 2–10) in which the polymer particles (A) are dispersed, in an amount of preferably 0.1–20 parts by weight, and still more preferably 0.5–10 parts by weight for 100 parts by weight of the polymer particles (A), and stirring the mixture at a temperature of 20–90° C., and preferably 40–80° C. for 0.1–6 hours.

As other methods, a method of reacting the alkoxy compound (D) with the polymer phase (b) using the above amount of the alkoxy compound (D) in the polymerization for forming the polymer phase (b) may be employed.

The polycondensation of the alkoxy compound (C) can be carried out by adding the alkoxy compound (C) to the dispersion liquid of which the pH is adjusted to preferably 3–10, and still more preferably 4.5–8.5 and stirring the mixture at a temperature of 30° C. or more, preferably 50–90° C., and still more preferably 60–80° C. for 0.1–10 hours.

The amount of the alkoxy compound (C) to be added is preferably 0.5–100 parts by weight, and still more preferably 1–60 parts by weight for 100 parts by weight of the polymer particles (A).

Specifying the amount of the alkoxy compound (C) in the above range ensures that a sufficient amount of the polymer of the alkoxy compound (C) is chemically bonded in the area at least either on or near the surface of the polymer phase (b), whereby a coating excelling in weatherability and stainproof characteristics can be obtained from the resulting composite particle dispersion composition.

Since the polycondensation proceeds through hydrolysis of the group represented by $OR^2$ in the formula (1) and dehydration condensation, water must be present in the polycondensation system. Therefore, in the case where the poor solvent used in the dispersion liquid is not water, water must be added so that the water content in the polycondensation system is 1 wt % or more, and preferably 10 wt % or more, although the content varies depending on the type of solvent.

Light stabilizers may be added to the composite particle dispersion composition of the present invention in order to improve weatherability.

There are no specific limitations to types of light stabilizers. Conventionally used light stabilizer for paints, synthetic rubbers, synthetic resins, fibers, and the like, such as organic nickel-type and hindered amine-type light stabilizers can be used. Among these, hindered amine-type light stabilizers such as bis(2,2,6,6-tetramethyl-4-piperidyl) sebacate, bis(1,2,2,6,6-pentamethyl-4-piperidyl)sebacate, 4-benzoyloxy-2,2,6,6-tetramethylpiperidine, tetraoxy(2,2,6,6-tetramethyl-4-piperidyl)-1,2,3,4-butane tetracarboxylate are preferable.

The amount of light stabilizer to be added is 0.1–10 parts by weight, and preferably 0.1–5 parts by weight for 100 parts by weight of the composite particle dispersion composition (solid content). Light stabilizers may be added by dissolving in at least either monomers or solvent or dispersing in water in advance. If the amount of light stabilizer exceeds 10 parts by weight, the resulting coating may be colored or storage stability of the dispersion liquid may decrease. If the amount is less than 0.1 part by weight, the effect may be insufficient.

A polymer of the alkoxy compound, which is the component (C), may be included in the polymer particles (A) in order to improve weatherability. In this case, the alkoxy compound is added to the dispersion liquid of the polymer particles (A) in an amount of 100 parts by weight or less for 100 parts by weight of the polymer particles (A) before reacting the polymer particles (A) with the alkoxy compound (D), thereby causing the alkoxy compound to be absorbed into the polymer particles (A). The absorbed alkoxy compound is polycondensed in the polycondensation of the alkoxy compound (C), whereby the polymer of the alkoxy compound is included in the polymer particles (A).

In the case of using water as the poor solvent in the composite particle dispersion composition of the present invention, an organic solvent may be added to the composite particle dispersion composition in order to improve film formability and wettability. Examples of such an organic solvent include alcohols such as methyl alcohol, ethyl alcohol, n-propyl alcohol, i-propyl alcohol, n-butyl alcohol, n-amyl alcohol, and n-hexyl alcohol; cellosolves such as methyl cellosolve, ethyl cellosolve, n-propyl cellosolve, i-propyl cellosolve, n-butyl cellosolve, and n-hexyl cellosolve; carbitols such as methyl carbitol and ethyl carbitol; cellosolve acetates such as methyl cellosolve acetate and ethyl cellosolve acetate; phosphates such as tri-n-butoxymethyl phosphate; and the like.

The proportion of the organic solvent to be added is 20 wt % or less, preferably 10 wt % or less, and still more preferably 5 wt % or less of the total weight of the aqueous dispersion.

As UV absorbers, p-methacryloxyphenyl salicylate, 2-hydroxy-4-methacryloxybenzophenone, 2-(2'-hydroxy-5'-methacryloxyethylphenyl)benzotriaole, and the like may be added.

As other additives, water soluble and water-dispersible resins conventionally used as aqueous resins, including carboxylated aromatic vinyl resins such as polyester resins, epoxy resins, acrylic resins, and styrene-maleic resin, urethane resins, anti-foaming agents, thickeners, heat stabilizers, leveling agents, lubricants, antistatic agents, dyes, pigments, antifungal agents, and the like can be used.

The composite particle dispersion composition containing the composite particle of the present invention and the method of preparing the composite particle dispersion composition are described above. The coating material using the composite particle dispersion composition is described below.

(Coating Material)

The composite particle dispersion composition of the present invention is used as or prepared as a coating material by adding additives such as pigments, dispersants, anti-foaming agents, antiseptic agents, film forming agents, or crosslinking agents.

The coating material is applied to the surface of a substrate so that the thickness of the coating is 10–1000 μm.

As a method of applying the coating material, conventional methods such as brush coating, hopper coating, bar coater coating, rotational coating, spray coating, curtain coating, dip coating, air knife coating, blade coating, or roll coating can be employed.

The applied coating material is dried at a temperature from room temperature to 200° C., whereby the coating is formed on the surface of the substrate.

The coating thus formed excels in weatherability and, in particular, stain-proof characteristics. These excellent characteristics are retained for a long period of time.

Therefore, the coating material containing the composite particles of the present invention is suitably applied to enamel paints and clear paints. The coating material is suitable as a coating material for various materials such as plastic films, plastic molded products, paper, fibers, wood, metals, glass, concrete, ceramics, slates, marble, pottery, plaster, and leather. The coating material can be used for interior and exterior of buildings, building materials, steel structures, concrete structures, precast materials, interior and exterior of vehicles, aluminum coatings, sealants, floor polishing, and the like.

EXAMPLES

The present invention will be described in detail by examples, which should not be construed as limiting the present invention. In the examples, part(s) and % respectively refer to part(s) by weight and wt % unless otherwise indicated.

Example 1
(Preparation of Composite Particles and Coating Dispersion)
<Preparation of Core>

A two-liter separable flask equipped with a stirrer, thermometer, heater, monomer feed pump, and nitrogen gas introducing device was charged with 70 parts of ion-exchanged water, 0.4 part of Adekareasoap SE-10N as a reactive emulsifier, 3.3 parts of n-butyl acrylate, 1.7 parts of methyl methacrylate, and 0.15 part of acrylic acid. The gas phase was replaced by nitrogen gas for 15 minutes. After heating the mixture to 60° C., 0.1 part of potassium persulfate was added. The monomers were then polymerized at 80° C. for 0.5 hour.

Another vessel was charged with 13 parts of ion-exchanged water, 1 part of the above reactive emulsifier, 11 parts of n-butyl acrylate, 6 parts of methyl methacrylate, 0.35 part of acrylic acid, and 0.1 part of potassium persulfate. The mixture was then stirred. The monomers were finely dispersed using an ultrasonic homogenizer ("RUS-600" manufactured by Nihon Seiki Kaisha, Ltd.) to prepare a pre-emulsion.

The pre-emulsion was continuously added dropwise to the above separable flask for one hour. Nitrogen gas was introduced during the addition of the pre-emulsion while maintaining the temperature inside the flask at 80° C. After the addition, the mixture was allowed to stand at 80° C. for 0.5 hour to form the core.

<Preparation of Shell and Dispersion Liquid>

Another vessel was charged with 32 parts of ion-exchanged water, 1 part of the above reactive emulsifier, 13 parts of 2-ethylhexyl acrylate, 30 parts of methyl methacrylate, 30 parts of cyclohexyl methacrylate, 2.5 parts of ethylene glycol dimethacrylate, 1 part of 2-hydroxyethyl methacrylate, 1 part of acrylic acid, and 0.1 part of potassium persulfate. The mixture was then stirred. The monomers were finely dispersed using an ultrasonic homogenizer ("RUS-600" manufactured by Nihon Seiki Kaisha, Ltd.) to prepare a pre-emulsion.

The pre-emulsion was continuously added dropwise to the above separable flask for 3 hours. Nitrogen gas was introduced during the addition of the pre-emulsion while maintaining the temperature inside the flask at 80°C. After the addition, polymerization was completed by allowing the mixture to stand at 85–95° C. for 2 hours to form the shell. After cooling the mixture to 25° C., the pH was adjusted to 5 using ammonia water. After the addition of 5 parts of methyltriethoxysilane and 2 parts of tetratriethoxysilane while stirring, the mixture was heated to 75° C. for 3 hours to obtain an aqueous copolymer dispersion liquid.

<Preparation of Composite Particles and Coating Dispersion>

After the addition of 1 part of γ-glycidoxypropyldimethoxymethylsilane and 2 parts of γ-glycidoxypropyltriethoxysilane, the mixture was stirred vigorously for about one hour. After the addition of 6 parts of methyltriethoxysilane and 2 parts of tetraethoxysilane, polycondensation was carried out while stirring the mixture at 70° C. for 3 hours. The mixture was then cooled and filtered using a 120-mesh (JIS) wire gauze to obtain an aqueous coating dispersion containing composite particles of (meth)acrylic polymers and polysiloxane. The solid content of the dispersion was 47.1% and the average particle diameter (measured using "Nanosizer" manufactured by Coulter, hereinafter the same) of the composite particles was 110 nm.

Example 2
(Preparation of Composite Particles and Coating Dispersion)
<Preparation of Core, Shell, and Dispersion Liquid>

A core and shell were formed in the same manner as in Example 1 except for using monomer components shown in Table 1 to prepare an aqueous copolymer dispersion liquid.
(Preparation of Composite Particles and Coating Dispersion)

Composite particles and an aqueous coating dispersion were prepared in the same manner as in Example 1. The solid content of the dispersion was 47.0% and the average particle diameter of the composite particles was 115 nm.

Comparative Examples 1 and 2

(Preparation of Composite Particle and Coating Dispersion)

A dispersion liquid of polymer particles having no core/shell structure was prepared in the same manner as in "preparation of shell and dispersion liquid" in Example 1 using monomer components shown in Table 1.

Composite particles and an aqueous coating dispersion were prepared in the same manner as in Example 1. The solid content of the dispersions obtained in Comparative Examples 1 and 2 was respectively 47.3% and 47.2%. The average particle diameters of the composite particles obtained in Comparative Examples 1 and 2 were respectively 115 nm and 113 nm.

In the Examples and Comparative Examples, the glass transition temperature was calculated using the above-described method. The glass transition temperatures of the homopolymers of each monomer were as follows.

n-Butyl acrylate: 219° K.
2-Ethylhexyl acrylate: 203° K.
Methyl methacrylate: 378° K.
Cyclohexyl methacrylate: 377° K.
2-Hydroxyethyl acrylate: 328° K.
Acrylic acid: 379° K.
Ethylene glycol dimethacrylate: 378° K.

Paints were prepared using the aqueous coating dispersions obtained in Examples 1 and 2 and Comparative Examples 1 and 2 using the components given below.

<Millbase>

CR97 (pigment, manufactured by Ishihara Sangyo Kaisha Ltd.): 20 parts
SN Dispersant 5027 (dispersant, manufactured by Fujiyoshi & Co., Ltd.): 0.5 part
Sodium hexametaphosphate (dispersant): 1 part
Ethylene glycol (anti-freezing agent): 0.29 part
SN113 (anti-foaming agent, manufactured by SAN NOPCO, Ltd.): 0.05 part.
Water: 5.96 parts <Letdown>

Millbase: 27.80 parts
Aqueous coating dispersion: 78.49 parts
20% aqueous solution of SN612 (thickener, manufactured by SAN NOPCO, Ltd.): 0.25 part
B1016 (anti-foaming agent, manufactured by Asahi Denka Kogyo K.K.): 0.05 part
SN113 (anti-foaming agent, manufactured by SAN NOPCO, Ltd.): 0.05 part
CS-12 (film-forming promoter, manufactured by Chisso Corp.): 3.69 parts Each paint obtained by the above combination was applied to a steel plate (JIS-3141, SPEC plate, 0.8×70×1500 mm) defatted with xylene and an alkali detergent using a spray gun so that the thickness after drying was 50 μm. The applied paints were then dried at 60° C. for 30 minutes.

(Evaluation Method)

(1) Evaluation of Film Formability

Film formability was graded according to five ranks given below by observing the presence or absence of cracks in the coatings thus obtained with the naked eye.

5: No cracks
4: Extremely slight cracks
3: Slight cracks
2: Cracks were observed on part of the film
1: Cracks were observed all over the surface (2) Evaluation of Carbon Stain A carbon dispersion liquid was applied to the above coated plate. The applied dispersion liquid was dried at room temperature for 30 minutes and then washed with water. The color difference ΔL was measured as an index of the stain level and graded according to five ranks given below.

5: Color difference ΔL was 10 or less
4: Color difference ΔL was more than 10, and 20 or less
3: Color difference ΔL was more than 20, and 30 or less
2: Color difference ΔL was more than 30, and 40 or less
1: Color difference ΔL was more than 40

(3) Rain Streak Test

The above coated plate was placed upright facing north in the outdoors in Yokkaichi for 3 months. The color difference ΔL was measured as an index of the stain level and graded according to five ranks given below.

5: Color difference ΔL was 5 or less
4: Color difference ΔL was more than 5, and 10 or less
3: Color difference ΔL was more than 10, and 15 or less
2: Color difference ΔL was more than 15, and 20 or less
1: Color difference ΔL was more than 20

(4) Weatherability Test

The above coated plate was exposed at 63° C. for 2000 hours. The gloss retention rate of the coated plate was measured using a Sunshine Weather Meter (WEL-SUNHC type, manufactured by Suga Test Instruments Co., Ltd.) and graded according to five ranks given below. In the measurement of the gloss retention rate, 60° specular gloss was measured according to JIS K5400.

5: Gloss retention rate was 80% or more
4: Gloss retention rate was 70% or more, and less than 80%
3: Gloss retention rate was 60% or more, and less than 70%
2: Gloss retention rate was 50% or more, and less than 60%
1: Gloss retention rate was less than 50%

The test results are shown in Table 2.

TABLE 1

| | Example | | | | Comparative Example | |
|---|---|---|---|---|---|---|
| | 1 | | 2 | | 1 | 2 |
| | Core | Shell | Core | Shell | — | — |
| Polymer particle | | | | | | |
| nBA | 14.3 | — | 6.7 | 31 | — | 40 |
| 2EHA | — | 13 | — | — | 16.8 | — |
| MMA | 7.7 | 30 | 15.3 | 22 | 38.7 | 28.4 |
| CHMA | — | 30 | — | 20 | 38.7 | 25.8 |
| HEMA | — | 1 | — | 1 | 1.3 | 1.3 |
| AA | 0.5 | 1 | 0.5 | 1 | 1.3 | 1.3 |
| EDMA | — | 2.5 | — | 2.5 | 3.2 | 3.2 |
| Glass transition temperature (° C.) | −14 | +56 | +38 | +19 | +56 | +19 |
| MTES | — | 5 | — | — | 5 | 5 |
| TEOS | — | 2 | — | — | 2 | 2 |
| Component (D) | | | | | | |
| GPTMS | 2 | | 2 | | 2 | 2 |
| GPDMMS | 1 | | 1 | | 1 | 1 |

TABLE 1-continued

|  | Example | | | | Comparative Example | |
|---|---|---|---|---|---|---|
|  | 1 | | 2 | | 1 | 2 |
|  | Core | Shell | Core | Shell | — | — |
| Component (C) | | | | | | |
| MTES | | 6 | | 6 | 6 | 6 |
| TEOS | | 2 | | 2 | 2 | 2 |

(Components in Table 1)
nBA: n-Butyl acrylate
2EHA: 2-Ethylhexyl acrylate
MMA: Methyl methacrylate
CHMA: Cyclohexyl methacrylate
HEMA: 2-Hydroxyethyl methacrylate
AA: Acrylic acid
EDMA: Ethylene glycol dimethacrylate
MTES: Methyltriethoxysilane
TEOS: Tetratriethoxysilane
GPTMS: γ-Glycidoxypropyltrimethoxysilane
GPDMMS: γ-Glycidoxypropyldimethoxymethylsilane

TABLE 2

|  | Example | | Comparative Example | |
|---|---|---|---|---|
|  | 1 | 2 | 1 | 2 |
| Property of dispersion | | | | |
| Total solid content (%) | 47.1 | 47.0 | 47.3 | 47.2 |
| Average particle diameter (nm) | 110 | 115 | 115 | 113 |
| Minimum film-forming temperature (° C.) | 50 | 25 | 55 | 23 |
| Property of coating | | | | |
| Carbon stain | 5 | 4–5 | 4 | 3 |
| Rain streak test | 5 | 4–5 | 4 | 3 |
| Weatherability test | 5 | 4–5 | 4 | 3 |
| Film formability | 5 | 4–5 | 3 | 3 |

The following is apparent from the results shown in Table 2.

The paint s prepared from the dispersions of Examples 1 and 2 which contain the composite particles of the present invention excel in film formability and form coatings excelling in weatherability and stain-proof characteristics in comparison with the paints prepared from the dispersions of Comparative Examples 1 and 2 which contain the composite particles with no core/shell structure.

A coating is formed from the composite particle dispersion composition containing the composite particles of the present invention with excellent film formability. The coating thus formed excels in weatherability and, in particular, stain-proof characteristics. These excellent characteristics are retained for a long period of time. Therefore, a coating material exhibiting excellent characteristics is prepared using the composite particle dispersion composition of the present invention.

Therefore, the composite particle dispersion composition and the coating material containing the composite particles of the present invention are suitably applied to enamel paints and clear paints, and are suitable as a coating material for plastic films, plastic molded products, paper, fibers, wood, metals, glass, concrete, ceramics, slates, marble, pottery, plaster, leather, and the like. The composite particle dispersion composition and the coating material can be used for the interior and exterior of buildings, building materials, steel structures, concrete structures, precast materials, interior and exterior of vehicles, aluminum coatings, sealants, floor polishing, and the like.

Obviously, numerous modifications and variations of the present invention are possible in light of the above teachings. It is therefore to be understood that, within the scope of the appended claims, the invention may be practiced otherwise than as specifically described herein.

What is claimed is:

1. A composite particle comprising:
   (i) a polymer particle which comprises 2–70 wt. % of a polymer phase (a) of the core and 98–30 wt. % of a polymer phase (b) of the shell; and
   (ii) a polymer of an organosilicon compound or organometallic compound, or both, present at least either on or near the surface of the polymer phase (b);
   wherein polymer phase (a), polymer phase (b) and polymer (ii) have different monomer compositions, and polymer (ii) is present on or near at least a portion of the surface of polymer phase (b).

2. The composite particle according to claim 1, wherein each of the polymer phase (a) and the polymer phase (b) is a (meth)acrylic polymer or copolymer, a fluorine-containing polymer, a polyurethane, a urethane/acrylic polymer, or a diene polymer.

3. The composite particle according to claim 1, wherein the polymer (ii) is chemically bonded to the polymer phase (b).

4. The composite particle according to claim 1, wherein the organosilicon compound or the organometallic compound is a compound shown by the following formula (1):

$$R^1_n M(OR^2)_{z-n} \tag{1}$$

wherein $R^1$ is a hydrogen atom or an organic group having 1–8 carbon atoms, excluding the group represented by $OR^2$, $R^2$ is an alkyl group having 1–6 carbon atoms, an aryl group having 1–6 carbon atoms, or an aryl group having 6–10 carbon atoms, M is Si or a metal atom with a valence of 3 or more, n is 0 or an integer of 1 or more, z is a valence of M, and z-n is an integer of 2 or more, provided that, when a plurality of $R^1$s is present, each $R^1$ may be the same or different, this also applies to $R^2$.

5. The composite particle according to claim 1, wherein the content of the polymer (ii) is 0.5–100 parts. by weight for 100 parts by weight of the polymer particles (i).

6. The composite particle according to claim 1, wherein the difference in the gel content between the polymer phase (a) and the polymer phase (b) is 5 wt. % or more.

7. The composite particle according to claim 1, wherein the difference in the glass transition temperature between the polymer phase (a) and the polymer phase (b) is 5° C. or more.

8. The composite particle according to claim 1, wherein a UV absorbent monomer or a radical scavenging monomer, or both, is copolymerized with at least either the polymer phase (a) or the polymer phase (b).

9. The composite particle according to claim 8, which comprises a UV absorbent monomer which is a compound selected from the group consisting of p-(meth) acryloxyphenyl salicylate, 2-hydroxy-4-(meth) acryloxybenzophenone, and 2-(2'-hydroxy-5'-(meth) acryloxyethylphenyl)benzotriazole.

10. The composite particle according to claim 8, which comprises a radical scavenging monomer which is a compound selected from the group consisting of:

4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloylamino-1,2,2,6,6-pentamethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetr amethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

11. The composite particle according to claim 8, wherein the proportion of at least either the UV absorbent monomer or radical scavenging monomer copolymerized in the polymer particles (i) is 0.1–30 wt. %.

12. The composite particle according to claim 1, wherein the average particle diameter of the composite particles dispersed in a dispersion is 5 μm or less.

13. The composite particle according to claim 1, wherein the minimum film-forming temperature of the composite particle is 90° C. or less.

14. A composite particle dispersion composition comprising:

(A) composite particles comprising (i) polymer particles which comprise 2–70 wt. % of a polymer phase (a) of the core and 98–30 wt. % of a polymer phase (b) of the shell, and (ii) a polymer of at least either an organosilicon compound or organometallic compound present at least either on or near the surface of the polymer phase (b), wherein polymer phase (a), polymer phase (b) and polymer (ii) have different monomer compositions, and polymer (ii) is present at or near at least a portion of the surface of polymer phase (b); and (B) a poor solvent for the composite particles (A).

15. The composite particle dispersion composition according to claim 14, wherein the weight ratio of the composite particles (A) to the poor solvent (B) (composite particles/poor solvent) is from 5/95 to 70/30.

16. A method of preparing a composite particle dispersion composition, comprising:

(i) preparing a dispersion liquid which comprises (A) polymer particles comprising 2–70 wt. % of a polymer phase (a) of the core and 98–30 wt. % of a polymer phase (b) of the shell, wherein a functional group capable of forming a linkage group by reaction with a group shown by formula OR², wherein R² is an alkyl group having 1–6 carbon atoms, an acyl group having 1–6 carbon atoms, or an aryl group having 6–10 carbon atoms) is bonded at least either on or near the surface of the polymer phase (b), and (B) a poor solvent for the polymer particles (A);

(ii) preparing (C) a compound shown by the following formula (1);

$$R^1{}_nM(OR^2)_{z-n} \quad (1)$$

wherein $R^1$ is a hydrogen atom or an organic group having 1–8 carbon atoms, excluding the group represented by $OR^2$, $R^2$ is an alkyl group having 1–6 carbon atoms, an acyl group having 1–6 carbon atoms, or an aryl group having 6–10 carbon atoms, M is Si or a metal atom with a valence of 3 or more, n is 0 or an integer of 1 or more, z is a valence of M, and z-n is an integer of 2 or more, provided that, when a plurality of $R^1$s is present, each $R^1$ may be the same or different, this also applies to $R^2$; and (iii) polycondensing the compound (C) in the dispersion liquid, wherein polymer phase (a), polymer phase (b) and the polycondensate (iii) have different monomer compositions, and polycondensate (iii) is present on or near at least a portion of the surface of polymer phase (b).

17. The method of preparing the composite particle dispersion composition according to claim 16, further comprising reacting the functional group bonded to the polymer particles (A) with (D) a compound shown by the following formula (2) before polycondensing the compound (C) shown by the formula (1):

$$R^1{}_xR^3{}_yM(OR^2)_{z-x-y} \quad (2)$$

wherein $R^1$, $R^2$, and M are the same as defined for the formula (1), $R^3$ represents a group capable of forming a linkage group by the reaction with the functional group bonded to the polymer particles (A) (excluding the group represented by $OR^2$), x is 0 or an integer of 1 or more, y is an integer of 1 or more, z is a valence of M, and z-x-y is an integer of 1 or more, provided that, when a plurality of $R^1$s is present, each $R^1$ may be the same or different, this also applies to $R^2$ and $R^3$.

18. The composite particle according to claim 1, wherein the core is not completely covered by the shell.

19. The composite particle according to claim 1, wherein polymer phase (a) is 10–60 wt. % and polymer phase (b) is 90–40 wt. %.

20. The composite particle according to claim 1, wherein the content of the polymer (ii) is 2–40 parts by weight for 100 parts by weight of the polymer particle (i).

21. The composite particle according to claim 1, wherein the average particle diameter of the composite particles dispersed in a dispersion is 0.03–0.5 μm.

22. The method of preparing a composite particle dispersion composition according to claim 16, wherein the poor solvent is water.

23. The composite particle dispersion composition according to claim 14, wherein the poor solvent is water.

* * * * *